United States Patent [19]

Houvouras

[11] 3,946,603
[45] Mar. 30, 1976

[54] ROTO-FLEX COUPLING
[76] Inventor: Michael P. Houvouras, 5351 W. Giddings St., Chicago, Ill. 60630
[22] Filed: Oct. 18, 1973
[21] Appl. No.: 407,499

Related U.S. Application Data
[63] Continuation-in-part of Ser. No. 341,948, March 16, 1973, Pat. No. 3,872,736.

[52] U.S. Cl. ............................................. 73/136 B
[51] Int. Cl.² ............................................ G01L 3/14
[58] Field of Search ....................... 73/136 R, 136 B

[56] References Cited
UNITED STATES PATENTS
3,253,658  5/1966  Bradley ............................ 73/136 A FOREIGN PATENTS OR APPLICATIONS
427,243  12/1948  Italy ................................ 73/136 R
5,804  1/1910  United Kingdom .............. 73/136 R
652,104  4/1951  United Kingdom .............. 73/136 R

*Primary Examiner*—James J. Gill
*Attorney, Agent, or Firm*—Haight, Hofeldt, Davis & Jambor

[57] ABSTRACT

This specification discloses a coupling between two rotational shafts for transmitting torque. It includes a positive, inelastic, interconnection between the shafts for torque transmission and a resilient element to control, measure or respond to the magnitude of torque transmitted. In another context, the disclosure includes a rotational power shaft having a torque measuring, sensing and responsive unit which provides a direct visual and physical indication of the torque transmitted through the shaft while additionally providing actuating means for controlling associated systems which, in some way, are related to the quantity of transmitted torque.

9 Claims, 2 Drawing Figures

U.S. Patent  March 30, 1976  3,946,603
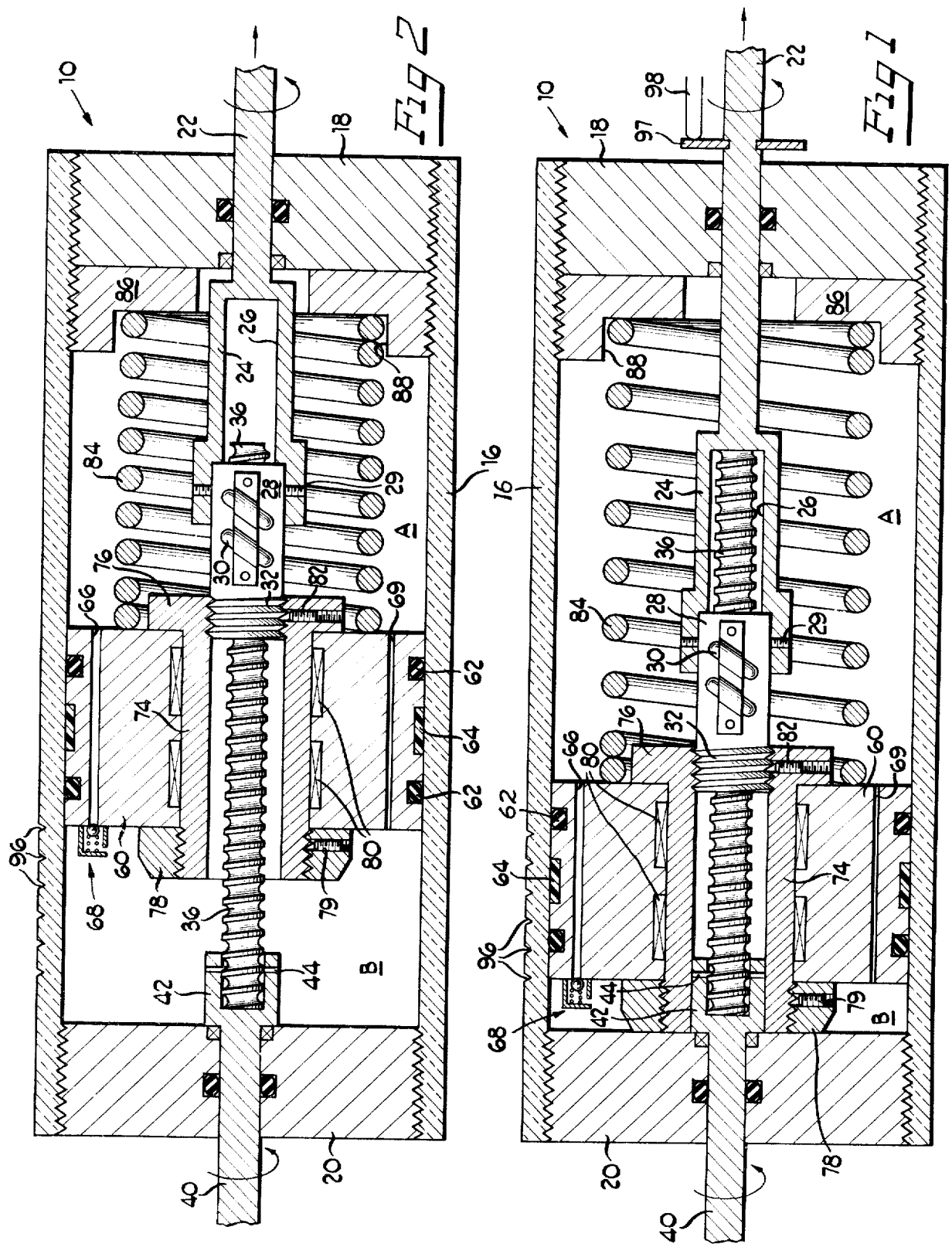

ROTO-FLEX COUPLING

CROSS REFERENCE

This application is a continuation-in-part of application Ser. No. 341,948, filed Mar. 16, 1973, now U.S. Pat. No. 3,872,736.

BACKGROUND OF THE INVENTION

This invention relates to a resilient coupling between two rotational shafts. More specifically, it relates to a coupling between two rotating shafts in which rotational forces are transmitted through a positive, inelastic interconnection, but yet provides an elastic, resilient response between the shafts for measuring the magnitude of the force transmitted and for absorbing and dampening force fluctuations.

In rotational drive systems, a direct, accurate and inexpensive method and apparatus for transmitting, sensing, measuring and responding to torque input is desirable. Further, if the device is placed in series with the drive system for greater accuracy, it must be capable of transmitting or measuring forces of large magnitudes with substantial variations. Finally, the unit should have resilient and dampening capabilities for modulating and smoothing torque input.

The prior art rotational coupling devices are believed to lack such wide applicability or to provide the inexpensive, accurate and reliable features of the instant invention as modified to meet the particular application. For example, U.S. Pat. No. 3,529,460 which issued to E. Marcus on Sept. 22, 1970 discloses a load sensor which uses a spring to interconnect and transmit rotational forces between rotating shafts. Although that disclosure may be contrasted in many ways, the instant invention seeks to utilize a relatively inelastic mechanical interlock between two shafts to transfer torque while resilient means are utilized primarily to control and measure the magnitude of transmitted torque.

SUMMARY OF THE INVENTION

To provide a desirable torque responsive coupling, the instant invention includes a connection permitting relative rotation and telescopic movement between two shafts. This connection permits the forces transmitted through the shaft to be divided into two vectors: a first vector which is longitudinal to the axis of the two shafts, and a second vector which is perpendicular to such axis. Thus, the second vector represents the transmission of torque while the first vector provides telescopic movement of the shafts. A biasing means is then utilized to oppose the longitudinal force vector with telescopic movement of the shaft being in direct proportion to the magnitude of transmitted torque. The longitudinal movement is then utilized to provide a visual indicia of the magnitude of the torque transmitted as well as to actuate other systems in accord with variations in torque applied. Accordingly, this invention may be utilized to achieve any one or all of the following objectives:

1. the provision of a flexible rotating coupling in which rotational movement is transmitted through positive, inelastic mechanical drive;
2. the provision of an in-line, inexpensive torque meter which is very accurate and permits the measurement of torque of substantially any magnitude;
3. the provision of a torque responsive mechanism in a rotational drive train which measures torque and is capable of activating other parts of a power system in accord with preslected parameters;
4. the provision of a rotational energy accumulator which receives and smooths out fluctuations in the torque applied to a rotational shaft;
5. the provision of a flexible, resilient, in-line coupling having inherent dampening capabilities which may find applicability in such diverse areas as antiskid devices for large trucks or as a replacement for torsion bars and suspension assemblies.

DESCRIPTION OF THE DRAWINGS

The manner in which these and other objects may be accomplished is depicted in the drawings in which:

FIG. 1 is a side elevational view of a preferred embodiment taken generally along a vertical plane passing through the center line of the device; and FIG. 2 is a view similar to FIG. 1 depicting the device in an operative condition.

DETAILED DESCRIPTION

With primary reference to FIG. 1, the preferred embodiment of the coupling is carried by a housing 10 which includes a cylindrical member 16 preferably formed of a transparent, plastic material such as Plexiglass. The cylinder 16 may be rigidly supported with its ends closed and sealed by end-plates 18 and 20 through a threaded connection with the cylinder. Extending through the center of the end caps 18 and 20 is a rotational power shaft comprising a power input shaft 22 which is coupled (in a manner subsequently explained) to a power output shaft 40. Preferably, the input and output shafts are supported for rotational motion within the end caps by bearing and seals as indicated.

The coupling between shafts 22 and 40 may take many forms, but should include a relatively rotatable and telescopic interconnection. Such permits the force transmitted between the shafts to be divided into a one vector component generally perpendicular to the longitudinal axis of the shafts and another vector component along the axis of the shafts. Thus, the perpendicular component transfers rotational force while the longitudinal component causes relative telescopic movement between the input shaft 22 and output shaft 40.

One such interconnection is a threaded coupling. In the preferred embodiment, such takes the form of a ball bearing screw having a nut 28 and a threaded screw 36. In this instance, the nut of the ball bearing screw 28 is received within a housing 24 of the power input shaft and is attached thereto and constrained for rotation therewith by pins or set screws 29. A counter bore 26 within the housing 24 receives the threaded screw 36 upon relative longitudinal or telescopic movement between the input and output shafts. The nut 28 is connected to the screw 36 by ball bearings and numeral 30 represents the return lines for the recirculating balls of the nut 28. The left end of the screw extends into a counterbore of boss 42 on output shaft 40 and a pin 44 extends through boss 42 and the shaft 36 constraining them for rotation with each other.

Considering now this relative rotational and longitudinal movement, it will be noted that if the input shaft 22 is rotated in the direction of the arrow of FIG. 1, such will cause the ball bearing nut 28 to rotate about the threaded screw 36. The ball bearings (not shown) will act between the threads of the nut 28 and those of shaft 36 to transmit force between the input shaft 22 and the output shaft 40. However, in view of the pitch of the threads, the force exerted by each ball bearing upon the threaded screw 36 can be resolved into two components as mentioned above. These vector components include a vector which is longitudinal to the axis of the two shafts and acts upon input shaft 22 to telescope it outwardly of end cap 18, this position being shown in FIG. 2. Simultaneously, however, each ball bearing will exert another vector force upon the threads which is perpendicular to the longitudinal axis. This component acts upon the threads of the ball bearing screw 36 to effect rotational motion of the output shaft 40. Obviously, by merely changing the pitch of the threads of the ball bearing unit, the designer can establish a wide variation in the ratio between the magnitude of the horizontal vector force and that of the longitudinal vector force. Stated in another manner, he has substantial design choice in selecting the ratio of relative rotational and longitudinal movement between the shafts.

To oppose longitudinal movement of the shaft and to provide an indicia of the magnitude of the torque transmitted through the shafts, a resilient biasing unit is provided. In the preferred embodiment, the resilient biasing unit includes a piston unit 60 which is constrained for reciprocable movement with the input shaft 22 within the housing 10. As subsequently explained, this piston 60 acts as a reaction surface for the biasing member. The piston 60 is attached to the ball bearing nut 28 through a collar 74 which has a threaded connection 32 with the ballbearing nut 28, the threaded connection being locked by set screw 82. This collar 74 has at one end a shoulder 76, and a spanner nut or other locking device 78 at the other end to locate and hold the piston 60 onto the collar 74. The nut 78 may also be locked to the collar 74 by a set screw 79. The piston 60 may be isolated from the rotational motion of the collar 74 by anti-friction means or roller bearings 80. Therefore, only reciprocable motion of bearing nut 28 is transmitted to piston 60. This reciprocal motion is normally effected upon rotational motion of shaft 22 in the direction of the arrows indicated in the figures. Opposing this reciprocation is a resilient biasing means which may take many forms. As shown, it includes a coil spring 84 which is placed between the piston 60 and the end plate 18. Then, as the input shaft is rotated, the piston is pulled to the right by the longitudinal vector force component, such action being resisted by the compression spring 84. When the expansion force of the spring 84 becomes equal to the longitudinal vector force exerted through the ball bearing screw, a steady state condition or equilibrium exists and the reciprocable action of the piston 60 is arrested while the input shaft transmits rotational motion to the output shaft 40. Since the longitudinal vector force is always proportional to the horizontal vector force, the spring compression and piston movement are also in direct proportion to the applied torque on shaft 22.

Further refinements of the preferred embodiment include the utilization of oil within the housing 10 to further dampen or to smooth out changes in torque input delivered to the shaft 22. Thus, with reference to the drawings, it will be observed that the piston 60 divides the housing 10 into two chambers, A and B. A small orifice 69 interconnects these chambers to permit the metering of fluid with a low flow rate between the two chambers. Such will dampen variations in torque input. In many applications, the designer may also prefer to have rapid movement of the piston 60 in one direction. The rapid movement in this case is to the right and is permitted by a second larger passage 66 communicating between the chambers A and B of such size as to permit the free flow of passage therethrough. However, a one-way valve unit 68 (as depicted in the drawings) precludes flow from the chamber B back to the chamber A, and requires that such intercommunication exist through the orifice 69. The direction of the one-way valve 68 might be placed on the opposite side of the piston 60 if the reverse condition or restrictions or movement were desired.

To isolate the chambers A and B from each other, seals 62 are provided around the circumference of the piston 60. Additionally, an annular teflon cylindrical member 64 may be placed on the circumference of the piston 60 to minimize friction between the housing or cylinder 16 and the piston 60. Finally, to further isolate chambers A and B, appropriate sealing means may be placed about the return tubes 30 for the ball bearings of the nut 28.

An adjustable abutment means 86 may be used as a reaction plate for the right end of the biasing means 84. Such may be an annular plate having a threaded engagement with the cylinder 16 and may be rotated to various positions to pre-select or pre-compress the spring 84 as desired. This annular plate 86 may also be provided with an annular shoulder 88 which receives the spring 84 and holds same in a proper concentric relationship with the input shaft 22.

MODE OF OPERATION

To clarify the operation of the device, it should be appreciated that the input shaft 22 is connected to a motor of some type for receiving rotational power. This rotational power is then transmitted to a threaded interconnection with an output shaft 40, the threaded connection having such a pitch as to exert a longitudinal vector force reaction between the input and output shaft and a rotational vector force on the output shaft 40. Thus, the rotational input power is delivered through a plurality of ball bearings within the nut 80 to the threads of the shaft 36, the plurality of ball bearings serving to equally transmit the force so as to minimize high stresses at any point within the interconnection. The horizontal vector is transmitted to the output shaft to transfer the rotational motion, while the longitudinal vector force tends to reciprocate the piston 60 to the right, as viewed in the drawings, against the bias of the spring 84, such reciprocation continuing until the longitudinal vector force equals the expansive force of the spring means at which time each revolution of the input shaft equals one complete revolution of the output shaft.

At the equilibrium condition, one may observe the position of the piston 60 through the transparent cylindrical member 16 and visually observe the magnitude of the torque transmitted by reading apropriate calibrations or indicia 96 on the transparent wall 16. Additionally, a washer 97 may be constrained for longitudinal motion with the input shaft so as to measure torque and actuate a linkage 98 to control an associated power system.

Obviously, many modifications of the preferred embodiment, as well as specific utilizations, are within the scope of my invention. For example, this unit permits a wide selectability of biasing means including a plurality of compression springs individually spaced concentrically about the piston, or concentrically of one another.

Too, it includes oil and air accumulators, as well as belleville washer units. Also, the response to the system and accuracy of measurement of torque transmission can be varied to suit the individual needs of the user. The use of a ball bearing screw substantially reduces friction losses and the pitch of the ball bearing unit can be varied to give a very substantial variation in longitudinal movement of the piston 60 for any increment of change in footpounds of torque applied. Too, if the longitudinal vector is increased, the magnitude of fluctuations in the horizontal vector component is dampened or reduced. Finally, the designer will want to consider the interrelationship between the pitch of the threaded screw 36 and the spring rate of the biasing means. At this point it should be noted that the device can be used merely as a rotational energy accumulator. For example, if the resistance on output shaft 40 is quite high, the input shaft can be rotated a substantial number of turns, assuming appropriate design, with the energy being stored in the biasing means. Then when the resistance to rotation of output shaft 40 is reduced, that shaft will be permitted to rotate under the expansion force of the spring 84.

Finally, the device will have substantial application in force limiting environments. For example, the unit might be set to operate a switch or hydraulic valve to control a motor or pump whenever the torque applied reaches a particular level.

Finally, in another embodiment of my invention, the piston unit might be centered in its normal, relaxed condition within the housing 10 with a biasing means being placed on opposite sides of the piston to react against each of the end plates 18 and 20. This permits the transmission of torque in either direction of rotation of the input shaft or output shaft, and also permits the torque to be measured regardless of the direction in which it is applied. These and many other modifications will be apparent through further study of the drawings and the specification.

I claim:

1. A torque meter comprising:
    a. a housing;
    b. an input shaft extending into said housing and an output shaft extending out of said housing, said shafts being journaled in said housing for relative rotation therewith;
    c. a threaded interconnection between said shafts for transmitting rotational motion from said input shaft to said output shaft, said interconnection permitting relative rotational and longitudinal motion between said shafts; and
    d. non-rotatable biasing means carried within said housing for opposing relative longitudinal motion of said shafts; said biasing means including a piston journaled on one of said shafts to permit relative friction-free rotation thereof; and spring means interposed between said piston and said housing.

2. An apparatus as recited in claim 1 in which:
    a. said piston divides said housing into two chambers filled with a fluid; and
    b. said piston includes means for metering fluid flow between said chambers.

3. An apparatus as recited in claim 1 in which said threaded interconnection includes a ball bearing screw and threaded nut with ball bearings interconnecting said screw and nut.

4. An apparatus as recited in claim 1 in which said housing is partially transparent.

5. Rotational power transfer shaft apparatus comprising:
    a. a housing;
    b. a power transfer shaft extending through said housing, said shaft including a threaded joint within said housing for permitting relative rotational and longitudinal movement of said shaft on opposite sides of said threaded joint;
    c. resilient means carried within said housing and interposed between the interior of said housing and said joint for opposing relative rotational and longitudinal movement of said shaft; and
    d. fluid dampening means within said housing for dampening changes in relative rotational and longitudinal movement of said shaft.

6. An apparatus as recited in claim 5 in which said resilient means includes:
    a. a piston means carried by said joint and spring means interposed between said housing and said piston means to oppose movement of said piston means.

7. A torque sensing mechanism comprising:
    a. a power input and power output shaft;
    b. a threaded interconnection between said shafts permitting relative rotational and translational movement of said shafts;
    c. reaction means carried by said interconnection and at least one of said shafts, said means being journaled on said interconnection and said shaft by anti-friction means; and
    d. biasing means interposed between said reaction means to oppose translational movement of said shafts.

8. An apparatus as recited in claim 7 in which a housing extends over said interconnection and forms said reaction means on said shaft.

9. An apparatus as recited in claim 7 in which said interconnection comprises a ball bearing screw and nut.

* * * * *